May 14, 1935.  W. H. GRINFIN  2,001,571
BASKET
Filed March 31, 1934  2 Sheets-Sheet 1

INVENTOR
William H. Grinfin
BY
Justin W. Macklin
ATTORNEY

May 14, 1935.　　　W. H. GRINFIN　　　2,001,571
BASKET
Filed March 31, 1934　　　2 Sheets-Sheet 2

INVENTOR
William H. Grinfin
BY
Justin W. Macklin
ATTORNEY

Patented May 14, 1935

2,001,571

UNITED STATES PATENT OFFICE 2,001,571

BASKET

William H. Grinfin, Cleveland, Ohio

Application March 31, 1934, Serial No. 718,467

6 Claims. (Cl. 217—122)

This invention relates to a basket, and particularly to a basket constructed of splints of wood veneer and adapted to be employed to hold fruits and vegetables.

It is an object of this invention to provide a basket which can be constructed cheaply.

It is another object of the invention to provide a basket capable of carrying a maximum load.

It is a further object of the invention to provide a basket which is strong and which will withstand shocks or blows without breaking.

It is another object of this invention to provide a basket having reinforcing means for the corners between the end walls and side walls of the basket.

It is a further object of the invention to provide a basket having reinforcing means for the end walls of the basket.

A further object of the invention is to provide a basket having diagonal bracing members reaching from one end of the basket to the other and extending between diagonally opposite corners and crossing beneath the basket and serving to strengthen the bottom.

Other objects of the invention and features of novelty will be apparent from the following description taken in connection with the accompanying drawings, in which Fig. 1 is a side elevational view of one embodiment of the basket provided by my invention.

Figure 1:
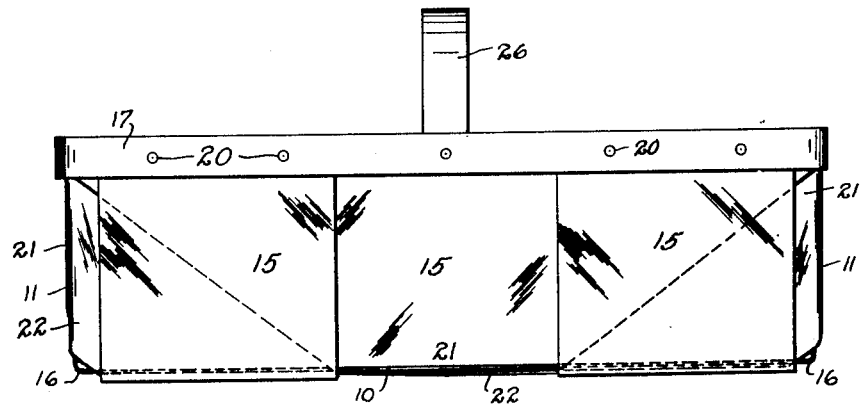

Referring to the drawings, it will be seen that the basket illustrated is of generally rectangular outline and is provided with a bottom indicated generally by the reference character 10, end walls indicated generally by the reference character 11 and side walls indicated generally by the reference character 12. The basket is constructed of splints of wood veneer, which may be of any suitable width and thickness.

Figure 5:
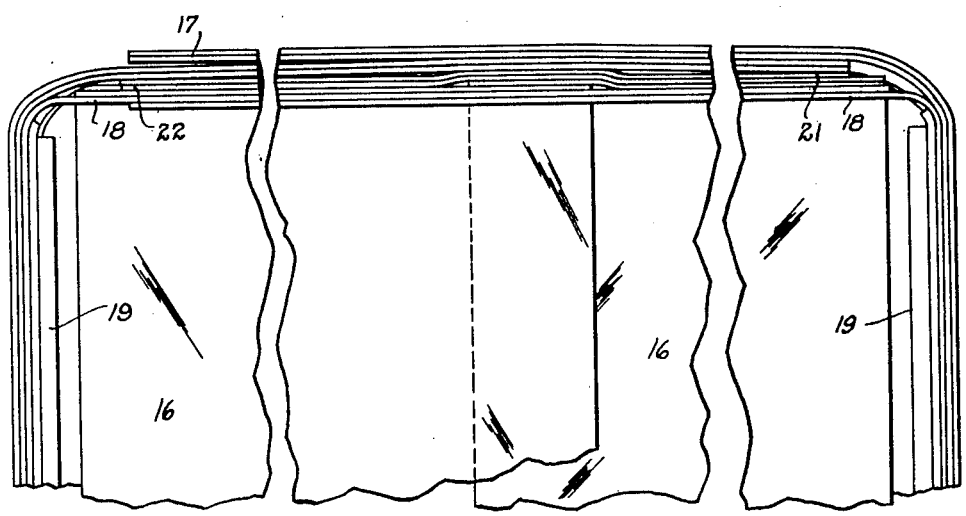
Fig. 5 is an enlarged fragmentary top view of an end of the basket shown in Fig. 1.

As shown in the drawings the basket is constructed of splints 15 extending laterally across the bottom and having their ends extending upwardly to form the side walls of the body. In addition there are splints 16 extending longitudinally of the bottom and having their ends extending upwardly to form the end walls of the basket body. As shown in the drawings there are two longitudinally extending splints, the edges of which overlap adjacent the middle of the basket, as is best shown in Fig. 5, and there are three laterally extending splints. The laterally extending splint adjacent the middle of the basket is positioned above the longitudinally extending splints, while the laterally extending splints adjacent the ends of the basket body are disposed beneath the longitudinally extending splints.

Reinforcing means is provided for the top margin of the basket body, and as shown in the drawings, there are a pair of strips 17 extending around the outside of the end and side walls of the basket, and in addition a strip 18 disposed on the outside of the side walls of the basket and extending inside of the end walls of the basket. In addition there is a relatively heavy reinforcing member 19 secured on the inside of each of the side walls adjacent the top margin thereof and extending substantially the entire length of the side walls. The upper ends of the splints forming the end and side walls are secured to the reinforcing strip in any desired manner, as by means of nails, tacks or staples 20.

Figure 2:
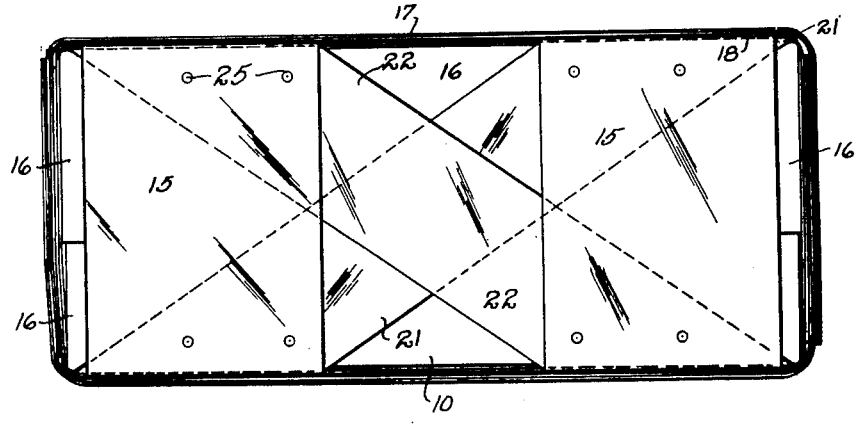
Fig. 2 is a bottom view of the basket shown in Fig. 1.
Figure 3:
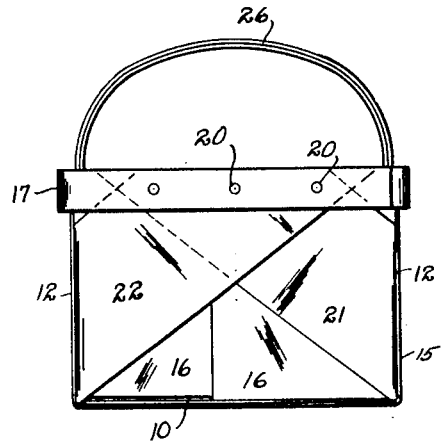
Fig. 3 is an end view of the basket shown in Fig. 1.
Figure 4:
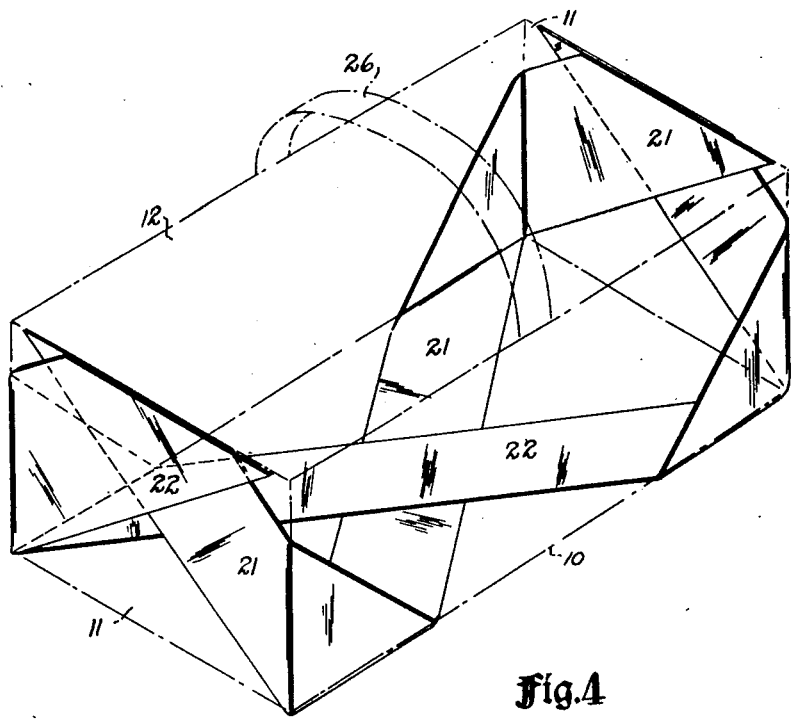
Fig. 4 is a perspective view showing the diagonal bracing members employed in the basket provided by my invention, the outline of the body of the basket being shown in broken lines.

In order to reinforce the basket, particularly the bottom and the regions adjacent the corners between the end and side walls, I have provided a pair of diagonally extending braces indicated by reference characters 21 and 22. Each of these diagonally bracing members is constructed of a splint of wood veneer and extends diagonally across the bottom of the basket, as best shown in Fig. 2. Each end of each of the bracing members is folded over the corner between the bottom of the basket and the side wall as is best shown in Figs. 1 and 4 of the drawings. The splint then extends around the corner between the side wall and the end wall of the basket, as is best shown in Figs. 3 and 4 of the drawings, and is secured to the reinforcing member adjacent the top margin of the end wall of the basket. As the bracing members extend diagonally of the basket, opposite ends of the bracing members extend around diagonally opposite corners of the basket body. The bracing members are preferably of substantial width so that the portions extending diagonally around the corners between the side walls and end walls of the basket are wide enough to extend substantially the entire distance between the bottom of the basket and the reinforcing rim at the top margin of the basket. As best shown in Figs. 3 and 4 of the drawings, the ends of the bracing members extend diagonally across the end walls of the basket, the ends of the two bracing members overlapping a substantial distance. This serves to reinforce the middle portion of the end walls of the basket.

In addition to having the splints secured to the reinforcing strip at the top margin of the end and side walls, the laterally extending splints, the longitudinally extending splints and the diagonal bracing members may be secured together by means of nails indicated by the reference character 25 and extending through the bottom of the basket.

If desired, the basket may be provided with a handle indicated by reference character 26, and constructed of one or more relatively thick pieces of wood veneer bent to generally semi-circular form and secured to the basket body by means of nails or staples extending through the reinforcing strip at the top of the body of the basket.

It has been found that the basket provided by my invention can be constructed very cheaply, that it is capable of carrying heavy loads and that it will withstand heavy shocks or blows without breaking. It is also found that the basket provided by this invention, because of the diagonal braces which extend around the corners between the end walls and side walls of the basket, is exceptionally strong in the regions of the corners, and the bottom is able to support great loads.

While one form of basket embodying my invention has been illustrated and described in detail, it should be understood that the invention is not limited to these details of construction, but numerous modifications may be made without departing from the scope of the appended claims.

Having thus described my invention, what I claim is:

1. In a basket, a body comprising a bottom, end walls and side walls, and a pair of bracing members, the bracing members each extending diagonally across the bottom of the basket body, each end portion of each of the bracing members extending around a vertical corner between the bottom and a side wall of the basket body and around a vertical corner between the side wall and an end wall of the basket body, and being secured adjacent the upper margin of the end wall.

2. In a basket, a body comprising a bottom, end walls and side walls, and a pair of bracing members, the bracing members each extending diagonally across the bottom of the body, one end of each bracing member extending around the upright corner between a side wall and an end wall of the basket body, the opposite end of the bracing member extending around the upright corner between a side wall and an end wall diagonally opposite the corner around which the first mentioned bracing member extends, each end of the bracing member being secured adjacent the upper margin of the end wall of the basket.

3. In a basket, a body comprising a bottom, end walls and side walls, and a pair of bracing members, the bracing members each extending diagonally across the bottom of the basket body, the end portions of each of the bracing members extending around the upright corner upright between the bottom and a side wall of the basket body and around the corner between the side wall and an end wall of the basket body and extending diagonally across the end wall of the basket, and being secured adjacent the upper margin of the end wall.

4. In a basket, a body formed of splints of wood veneer, and having a bottom, end walls and side walls, some of the splints extending laterally across the bottom and having their ends extending upwardly and forming the side walls of the basket, other splints extending longitudinally of the bottom and having their ends extending upwardly and forming the end walls of the basket, a reinforcing strip extending around the top margin of the end and side walls, the upper ends of the splints being secured to said reinforcing strip, and a pair of bracing members, said bracing members each comprising a member extending diagonally across the bottom of the basket body, the end portions of each of the bracing members extending around the corner between the bottom and side walls of the basket body and around the corners between the side wall and an end wall of the basket body, the ends of the bracing members being secured to said reinforcing strip.

5. A basket having side walls, end walls and a bottom, and a reinforcing rim at the top margin, and having reinforcing strips overlapping and having one end secured at the top margin of the end walls, the reinforcing strips extending diagonally around the corners and crossing at the bottom of the basket, and thence extending upwardly and having the other end similarly secured at the opposite end of the basket, the reinforcing strips being of such width as to extend at the corners substantially from the bottom to the reinforced margin.

6. In a basket, a body comprising a bottom, end walls and side walls, a pair of diagonal bracing members each extending diagonally across the bottom of the basket, the end portions of each of the bracing members extending around the corner between the bottom and side walls of the basket, and around the corner between the side wall and an end wall of the basket, and extending diagonally across the end wall of the basket, the ends of the bracing members overlapping for a material distance at the end of the basket and being trimmed flush with the top of the end wall, and common means for securing together the end walls, the ends of the bracing members and the reinforcing strip.

WILLIAM H. GRINFIN.